(12) United States Patent
Tanaka et al.

(10) Patent No.: US 11,604,458 B2
(45) Date of Patent: Mar. 14, 2023

(54) ANOMALY DETERMINATION DEVICE AND ANOMALY DETERMINATION METHOD

(71) Applicant: Nissan Motor Co., Ltd., Kanagawa (JP)

(72) Inventors: Yasuhiro Tanaka, Kanagawa (JP); Minoru Tomikashi, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 17/761,505

(22) PCT Filed: Sep. 17, 2019

(86) PCT No.: PCT/JP2019/036383
§ 371 (c)(1),
(2) Date: Mar. 17, 2022

(87) PCT Pub. No.: WO2021/053717
PCT Pub. Date: Mar. 25, 2021

(65) Prior Publication Data
US 2022/0350317 A1 Nov. 3, 2022

(51) Int. Cl.
G05B 19/418 (2006.01)
(52) U.S. Cl.
CPC ............ *G05B 19/41875* (2013.01); *G05B 2219/32368* (2013.01); *G05B 2219/45135* (2013.01)
(58) Field of Classification Search
None
See application file for complete search history.

(56) References Cited

U.S. PATENT DOCUMENTS

| 6,216,066 | B1* | 4/2001 | Goebel | G06K 9/6284 |
| | | | | 701/99 |
| 9,824,060 | B2* | 11/2017 | Yacout | G01D 3/10 |
| 10,296,832 | B1* | 5/2019 | Segev | G06Q 30/0201 |
| 10,489,716 | B2* | 11/2019 | Meadow | G06N 7/005 |
| 10,509,695 | B1* | 12/2019 | Averbuch | G06N 20/00 |
| 2005/0149570 | A1* | 7/2005 | Sasaki | G06Q 10/06 |
| 2011/0213636 | A1* | 9/2011 | Sakuma | G06Q 10/087 |
| | | | | 705/7.25 |
| 2013/0046725 | A1* | 2/2013 | Cammert | G06F 16/24568 |
| | | | | 706/58 |
| 2016/0021026 | A1* | 1/2016 | Aron | H04L 47/827 |
| | | | | 709/226 |
| 2016/0282229 | A1* | 9/2016 | Qin | G06N 3/006 |

(Continued)

FOREIGN PATENT DOCUMENTS

| JP | H05-337663 A | 12/1993 |
| JP | 2007-257366 A | 10/2007 |

(Continued)

*Primary Examiner* — Jason Lin
(74) *Attorney, Agent, or Firm* — Osha Bergman Watanabe & Burton LLP (57) ABSTRACT

An anomaly determination device and an anomaly determination method determine an anomaly of a device based on state data of the device, by using a first determination model configured to determine whether a predetermined anomaly has occurred in the device, and a second determination model configured to classify state of the device, and output the determined anomaly of the device as an unknown anomaly in a case where the anomaly of the device is not the predetermined anomaly.

9 Claims, 6 Drawing Sheets

(56) References Cited

U.S. PATENT DOCUMENTS

| | | | |
|---|---|---|---|
| 2016/0342903 A1* | 11/2016 | Shumpert | G06F 11/008 |
| 2018/0096261 A1* | 4/2018 | Chu | G06N 20/20 |
| 2018/0100784 A1 | 4/2018 | Patil et al. | |
| 2018/0211374 A1 | 7/2018 | Tanaka et al. | |
| 2018/0247256 A1 | 8/2018 | Takigawa | |
| 2018/0373234 A1* | 12/2018 | Khalate | G06N 7/005 |
| 2019/0188212 A1* | 6/2019 | Miller | G06N 7/005 |
| 2020/0293789 A1 | 9/2020 | Ito et al. | |
| 2021/0365000 A1* | 11/2021 | Mittelstädt | G06N 20/00 |

FOREIGN PATENT DOCUMENTS

| | | |
|---|---|---|
| JP | 2018-120300 A | 8/2018 |
| JP | 2019-124984 A | 7/2019 |
| JP | 2019-145079 A | 8/2019 |
| WO | 2019/058775 A1 | 3/2019 |

\* cited by examiner

ANOMALY DETERMINATION DEVICE AND ANOMALY DETERMINATION METHOD

TECHNICAL FIELD

The present invention relates to an anomaly determination device and an anomaly determination method.

BACKGROUND ART

Patent Literature 1 discloses a technique in which after learning a normal norm or anomalous norm by performing machine learning (supervised learning) using a neural network or the like for supervised data including a monitor signal of a welding device at normal and abnormal times, the type of anomaly is identified in a case where the welding is determined to be anomalous based on an actual welding monitor signal.

CITATION LIST

Patent Literature

Patent Literature 1: Japanese Patent Laid-Open No. H5-337663

SUMMARY OF INVENTION

Technical Problem

However, the technique described in Patent Literature 1 learns a known anomaly and does not correspond to an unknown anomaly. An unknown anomaly may occur not only in the welding device but also in production equipment, but when machine learning using failure patterns as supervised data is used, there is a problem that the unknown anomaly is overlooked and may be mistakenly determined as normal.

The present invention has been made in view of the problem described above, and an object of the present invention is to provide an anomaly determination device and an anomaly determination method that can determine normality and anomaly of a device without overlooking an unknown anomaly of the device.

In order to solve the above problems, an anomaly determination device and an anomaly determination method according to an aspect of the present invention determine an anomaly of a device based on state data of the device, by using a first determination model configured to determine whether a predetermined anomaly has occurred in the device, and a second determination model configured to classify state of the device, and output the determined anomaly of the device as an unknown anomaly in a case where the anomaly of the device is not the predetermined anomaly.

Advantageous Effects of Invention

According to the present invention, it is possible to determine normality and anomaly of a device without overlooking an unknown anomaly of the device.

DESCRIPTION OF EMBODIMENTS

Embodiments of the present invention will be described below in detail with reference to the accompanying drawings. In the following descriptions, like elements are denoted by like reference signs and redundant descriptions thereof will be omitted.

Figure 1:
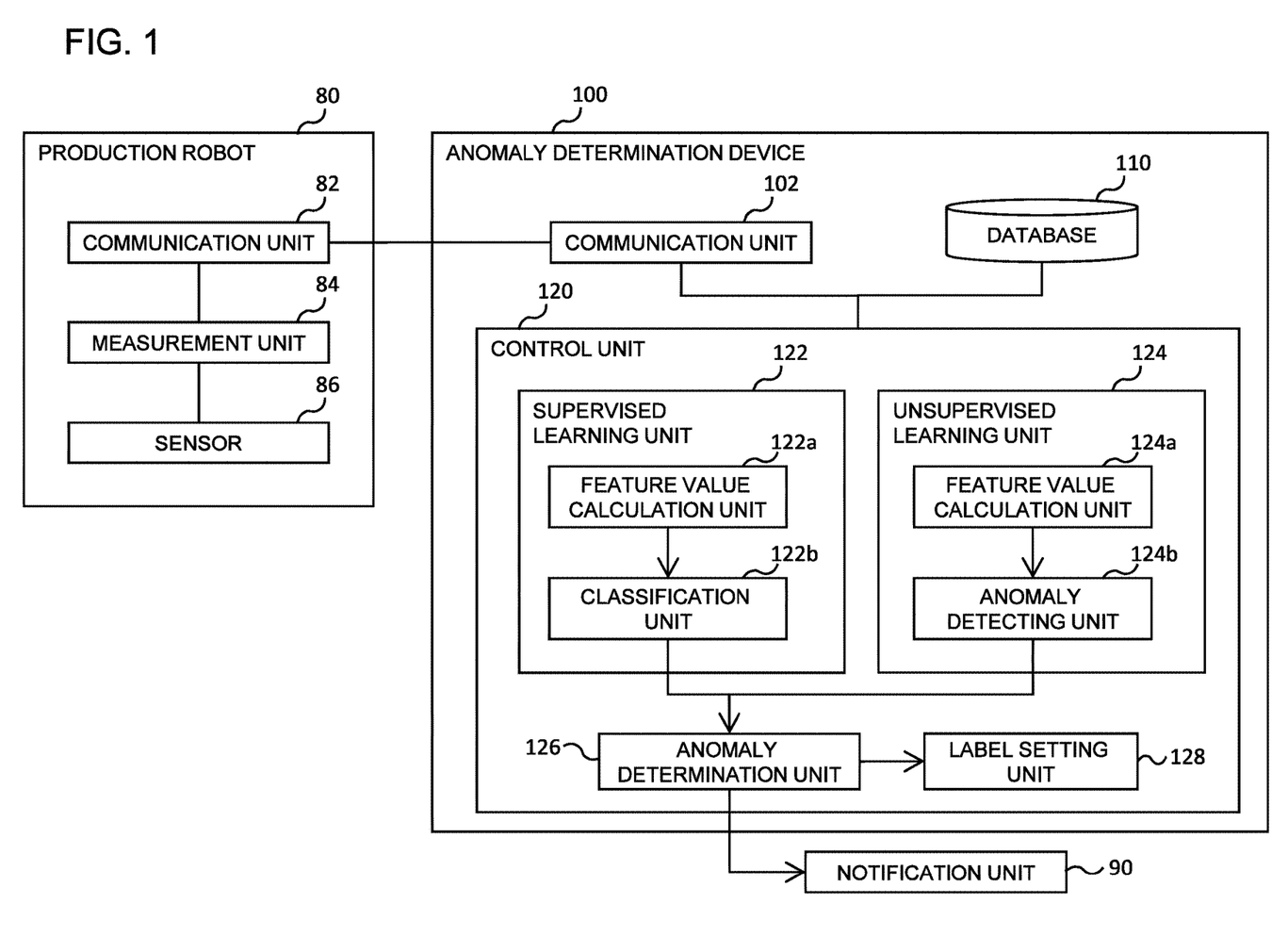
FIG. 1 is a block diagram showing a configuration of an anomaly determination device and a production robot to be determined according to an embodiment of the present invention.

FIG. 1 is a block diagram showing a configuration of an anomaly determination device and a production robot to be determined according to the present embodiment.

The anomaly determination device 100 is connected wirelessly or by wire so as to be able to communicate with the production robot 80 (device). The anomaly determination device 100 determines whether or not the work performed by the production robot 80 is anomalous, or whether or not the production robot 80 itself is anomalous. The production robot 80 is, for example, a robot that includes a plurality of movable parts and executes welding work of a vehicle body.

Configuration of Production Robot

The production robot 80 includes a communication unit 82, a measurement unit 84, and a sensor 86.

The sensor 86 detects the state of the production robot 80. The sensor 86 is composed of, for example, a torque sensor, an acceleration sensor, and the like. In addition, the sensor 86 may be, for example, a camera that captures an image or a moving image, an optical sensor, a sound sensor, an acceleration sensor, a vibration sensor, a pressure sensor, a strain sensor, an acoustic emission sensor, a temperature sensor, a humidity sensor, or the like. In addition, the sensor 86 may be a position sensor that measures the position of the movable part of the production robot 80, a sensor that measures the control driving force or torque generated by the control drive unit, or the like.

The measurement unit 84 generates state data of the production robot 80 from the data related to the state of the production robot 80 detected by the sensor 86. The state data of the production robot 80 may be the data itself (so-called raw data) obtained by the sensor 86, or the data obtained by analyzing the data obtained by the sensor 86 by an arithmetic circuit or the like (not shown). Further, the state data of the production robot 80 may include information (time stamps such as date and time) of the date and time when the data was acquired by the sensor 86.

The communication unit 82 transmits the state data of the production robot 80 generated by the measurement unit 84 to the anomaly determination device 100. The communication unit 82 may accumulate and transmit the state data to the anomaly determination device 100 at regular time intervals or transmit the state data generated by the measurement unit 84 to the communication unit 82 in real time.

In addition, the data transmitted by the communication unit 82 to the anomaly determination device 100 may include data such as the type, load amount, and frequency of the work performed by the production robot 80. When maintenance (repair, replacement of parts, refueling of lubricating oil, etc.) of the production robot 80 is performed, the data transmitted by the communication unit 82 may include maintenance data (maintenance history, maintenance location information) indicating that maintenance has been performed.

Configuration of Anomaly Determination Device

The anomaly determination device 100 includes a communication unit 102 (input unit), a database 110, and a control unit 120 (controller). The control unit 120 is connected to be able to communicate with the communication unit 102 and the database 110. In addition, the control unit 120 is connected to be able to communicate with a notification unit 90. The notification unit 90 may be provided by the anomaly determination device 100 itself or may be installed outside the anomaly determination device 100.

The communication unit 102 is connected wirelessly or by wire to be able to communicate with the communication unit 82 of the production robot 80. The communication unit 102 receives the state data of the production robot 80 from the communication unit 82 of the production robot 80. That is, the data output from the sensor that detects the state of the device is input to the communication unit 102. In addition, the communication unit 102 may receive data such as the type, load amount, and frequency of work performed by the production robot 80, and maintenance data.

The data received by the communication unit 102 is stored in the database 110. The data stored in the database 110 is read out by the control unit 120 when the anomaly determination process is executed. When the database 110 stores the state data of the production robot 80, the database 110 may store data such as the type, load amount, and frequency of the work performed by the production robot 80 in association with the state data of the production robot 80. Furthermore, the database 110 may store the maintenance data of the production robot 80 in association with the state data of the production robot 80.

The control unit 120 determines an anomaly of the production robot 80 based on the state data of the production robot 80.

When the control unit 120 determines that the production robot 80 is anomalous, the notification unit 90 issues an abnormal alarm based on a command from the control unit 120 and notifies the observer or maintenance personnel that the anomaly has been detected. For example, the notification unit 90 may be a rotating light, a buzzer, or the like.

Configuration of Control Unit

The control unit 120 (an example of a processing unit and a controller) is a general-purpose microcomputer including a CPU (central processing unit), a memory, and an input/output unit. A computer program (anomaly determination program) for functioning as a part of the anomaly determination device 100 for determining the anomaly of the production robot 80 is installed in the control unit 120. By executing the computer program, the control unit 120 functions as a plurality of information processing circuits (122, 124, 126, 128) included in the anomaly determination device 100.

In the present embodiment, an example is shown in which a plurality of information processing circuits (122, 124, 126, 128) are realized by software. However, it is also possible to configure information processing circuits (122, 124, 126, 128) by preparing dedicated hardware for executing each of the following information processing. Further, a plurality of information processing circuits (122, 124, 126, 128) may be configured by individual hardware. Further, the information processing circuit (122, 124, 126, 128) may also be used as a control unit used for monitoring or controlling the production robot 80.

The control unit 120 includes a supervised learning unit 122, an unsupervised learning unit 124, an anomaly determination unit 126, and a label setting unit 128, as a plurality of information processing circuits (122, 124, 126, 128).

The supervised learning unit 122 includes a feature value calculation unit 122a and a classification unit 122b. The supervised learning unit 122 reads the state data of the production robot 80 from the database 110, and performs various processes based on the read state data.

The feature value calculation unit 122a calculates a feature value representing the feature of each state data based on each state data of the production robot 80. The feature value calculated by the feature value calculation unit 122a is transmitted to the classification unit 122b.

The feature value calculation unit 122a may calculate, as the feature value, statistics (for example, mean, variance, distortion, kurtosis, etc.) specified in advance by the user, various analysis values (values of specific spectra after Fourier conversion, ratios between spectra, etc.), or a combination of these. The feature value calculation unit 122a may calculate, as the feature value, a quantity automatically set using various feature quantity selection methods such as principal component analysis, random forest, and XGBoost. The parameter for defining the "feature value" calculated by the feature value calculation unit 122a may be stored in the database 110.

The classification unit 122b has a first determination model generated by performing machine learning before performing the anomaly determination process. The first determination model is generated in advance by performing machine learning based on "supervised data" consisting of the "feature value" calculated by the feature value calculation unit 122a based on the past state data of the production robot 80 and a "class" indicating the state of the production robot 80 that outputs the state data. That is, the first determination model is generated based on the pair of "feature value" and "class". It can be said that the first determination model is a model generated by supervised learning in that the "class" which is a target output corresponding to the "feature value" is given. The first determination model included in the classification unit 122b may be stored in the database 110.

The first determination model generated by supervised learning is a model that expresses the correspondence between the "state data" and the "class" of the production robot 80. By using the feature value calculated by the feature value calculation unit 122a and the first determination model, the classification unit 122b calculates the class to which the "state data" of the production robot 80 should be classified. That is, the first determination model is a model for determining whether a predetermined anomaly (an anomaly corresponding to the class given as "supervised data") has occurred in the production robot 80.

The classification unit 122b may calculate with probability which class the state data should be classified by using the first determination model. In addition, the classification unit 122b may determine which class should the state data be classified according to whether the difference between the feature value of the data point representing the class and the feature value calculated from the state data is equal to or less than a predetermined threshold value.

In addition, the first determination model held in the classification unit 122b may be generated in advance before performing a series of anomaly determination process or may be updated sequentially during a series of anomaly determination process.

In a case where the first determination model is sequentially updated, the "state data" used to generate the first determination model means a state data read before performing the anomaly determination process based on the newly read state data. That is, the first determination model is generated based on the "state data" obtained earlier than a certain timing of the anomaly determination process. In addition, the state data that was the target of anomaly determination process at a certain timing may be used to generate the first determination model at a timing of performing the anomaly determination process after the certain timing.

There are at least two "classes" used to generate the first determination model, a "normal class" and an "anomalous class". The "normal class" corresponds to the normal state of the production robot 80, and the "anomalous class" corresponds to the anomalous state of the production robot 80. In addition to this, the "anomalous" state may be distinguished based on the content of the anomaly, such as "anomaly 1", "anomaly 2", . . . , "anomaly N". In this case, the "anomalous class" is divided into a plurality of classes such as "anomalous class 1", "anomalous class 2", . . . , "anomalous class N".

The unsupervised learning unit 124 includes a feature value calculation unit 124a and an anomaly detecting unit 124b. The unsupervised learning unit 124 reads the state data of the production robot 80 from the database 110 and performs various processes based on the read state data.

The feature value calculation unit 124a calculates a feature value representing the feature of each state data based on each state data of the production robot 80. The feature value calculated by the feature value calculation unit 124a is transmitted to the anomaly detecting unit 124b.

The "feature value" calculated by the feature value calculation unit 124a may be the same as or different from the "feature value" calculated by the feature value calculation unit 122a.

The feature value calculation unit 124a may calculate, as the feature value, statistics specified in advance by the user, physical quantities, etc., or a combination of these. The feature value calculation unit 124a may calculate, as the feature value, a quantity automatically set using various feature quantity selection methods such as principal component analysis, random forest, and XGBoost. The parameter for defining the "feature value" calculated by the feature value calculation unit 124a may be stored in the database 110.

The anomaly detecting unit 124b has a second determination model generated by performing machine learning before performing the anomaly determination process. The second determination model is generated in advance by performing machine learning based on the "feature value" calculated by the feature value calculation unit 124a based on the past state data of the production robot 80. It can be said that the second determination model is a model generated by unsupervised learning in that the target output corresponding to the "feature value" is not given unlike the first determination model. The second determination model included in the anomaly detecting unit 124b may be stored in the database 110.

The second determination model generated by unsupervised learning is a model that classifies the "state data" of the production robot 80 into at least two or more groups. That is, the second determination model is a model that classifies the states of the production robot 80 into at least two or more groups.

The two or more groups include a "normal area" group corresponding to the normal state of the production robot 80 and an "anomalous area" group corresponding to the anomalous state of the production robot 80. The anomaly detecting unit 124b performs anomaly determination by determining whether the state of the production robot 80 is classified into "normal" or "anomalous" by using the feature value calculated by the feature value calculation unit 124a and the second determination model.

The anomaly determination performed by the anomaly detecting unit 124b may use, for example, a change detection method of the correlation of a plurality of signals such as sparse structure learning. The anomaly determination may calculate degree of anomaly by a method using a probability distribution, such as kernel density estimation or density ratio estimation.

The anomaly detecting unit 124b may calculate with probability which class the state data should be classified by using the second determination model. In addition, the anomaly detecting unit 124b may determine which class should the state data be classified according to whether the difference between the feature value of the data point representing the class and the feature value calculated from the state data is equal to or less than a predetermined threshold value.

In addition, the second determination model held in the anomaly detecting unit 124b may be generated in advance before performing a series of anomaly determination process or may be updated sequentially during a series of anomaly determination process.

In a case where the second determination model is sequentially updated, the "state data" used to generate the second determination model means a state data read before performing the anomaly determination process based on the newly read state data. That is, the second determination model is generated based on the "state data" obtained earlier than a certain timing of the anomaly determination process. In addition, the state data that was the target of anomaly determination process at a certain timing may be used to generate the second determination model at a timing of performing the anomaly determination process after the certain timing.

The anomaly determination unit 126 determines the anomaly of the production robot 80 by using the determination result by the first determination model in the classification unit 122b and the determination result by the second determination model in the anomaly detecting unit 124b. If the anomaly of the production robot 80 is not a predetermined anomaly, the anomaly determination unit 126 determines that the anomaly of the production robot 80 is an unknown anomaly and outputs the anomaly to the database 110 and the notification unit 90. The details of the determination process in the anomaly determination unit 126 will be described later.

The label setting unit 128 adds a "new class" corresponding to the "unknown anomaly" determined by the anomaly determination unit 126 to the "class" used when generating the first determination model. As a result of the addition of the "new class" corresponding to the "unknown anomaly", the pair of the "feature value" and the "new class" corresponding to the "unknown anomaly" is used as new "supervised data" to generate (or modify) the first determination model.

At the timing when the anomaly determination unit 126 determines that the anomaly of the production robot 80 is an unknown anomaly, the label setting unit 128 sequentially adds a "new class" corresponding to the "unknown anomaly". Furthermore, the label setting unit 128 may add a "new class" corresponding to the "unknown anomaly" at the timing when the occurrence of the "unknown anomaly" is detected more than a predetermined number of times.

Example of Determination Model

Figure 3:
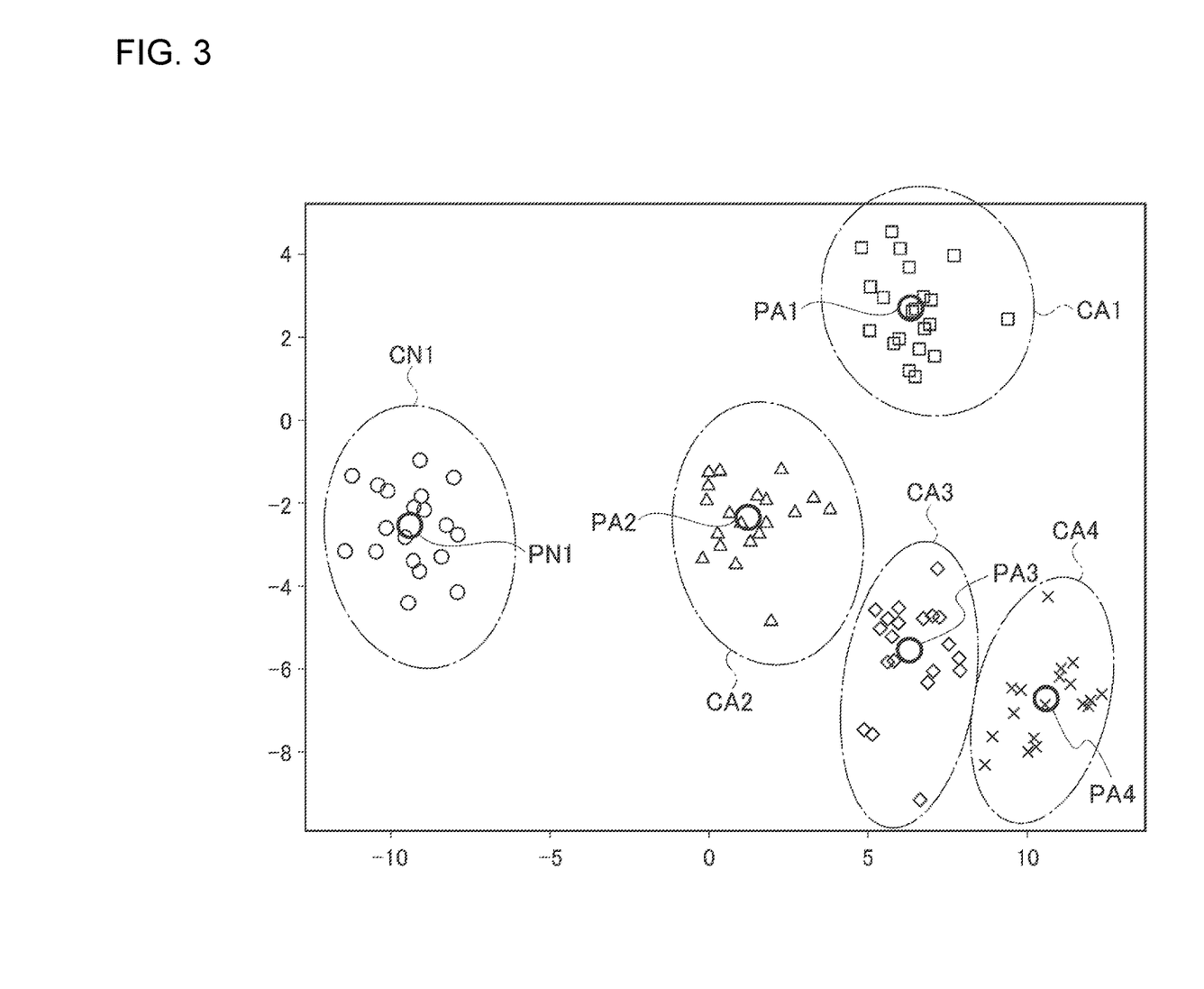
FIG. 3 is a schematic diagram showing how state data of the devices are classified.

Next, an example of the first determination model in which the "state data" corresponding to the "feature value" given as the "supervised data" is classified into a plurality of classes will be described. FIG. 3 is a schematic diagram showing how state data of the devices are classified.

FIG. 3 shows that data points corresponding to a plurality of "state data" are distributed in a space having "feature value" as a coordinate axis, and the plurality of data points are represented by symbols: White Circle, White Square, White Triangle, White Rhombus, and Cross. In FIG. 3, the coordinate axes of the "feature value" are shown as the vertical axis and the horizontal axis, but the space having the "feature value" as the coordinate axis is not limited to two dimensions. The space may be one-dimensional or may be multidimensional with three or more dimensions.

The set of data points indicated by White Circle is classified into the normal class CN1, and the normal class CN1 has the normal class representative value PN1. The normal class representative value PN1 may be calculated by the average, median value, or various statistics of the feature values of the data points indicated by White Circle.

Similarly, the set of data points indicated by White Square is classified into the anomalous class CA1 having the anomalous class representative value PAL The set of data points indicated by White Triangle is classified into the anomalous class CA2 having the anomalous class representative value PA2. The set of data points indicated by White Rhombus is classified into the anomalous class CA3 having the anomalous class representative value PA3. The set of data points indicated by Cross is classified into the anomalous class CA4 having the anomalous class representative value PA4. The calculation of the anomalous class representative values PA1, PA2, PA3, and PA4 is the same as that of the normal class representative value PN1.

The state corresponding to the data points belonging to the normal class CN1 is the normal state of the production robot 80. On the other hand, the states corresponding to the data points belonging to the anomalous classes CA1, CA2, CA3, and CA4 are the anomalous states of the production robot 80, and the contents of the anomalies are different in each state. For later explanation, it is assumed that the anomalies corresponding to the anomalous classes CA1, CA2, CA3, and CA4 are "anomaly 1", "anomaly 2", "anomaly 3", and "anomaly 4", respectively.

As described above, according to the first determination model, the "state data" corresponding to the "feature value" given as the "supervised data" is classified into a plurality of classes.

Processing by the Anomaly Determination Unit

Figure 4A:
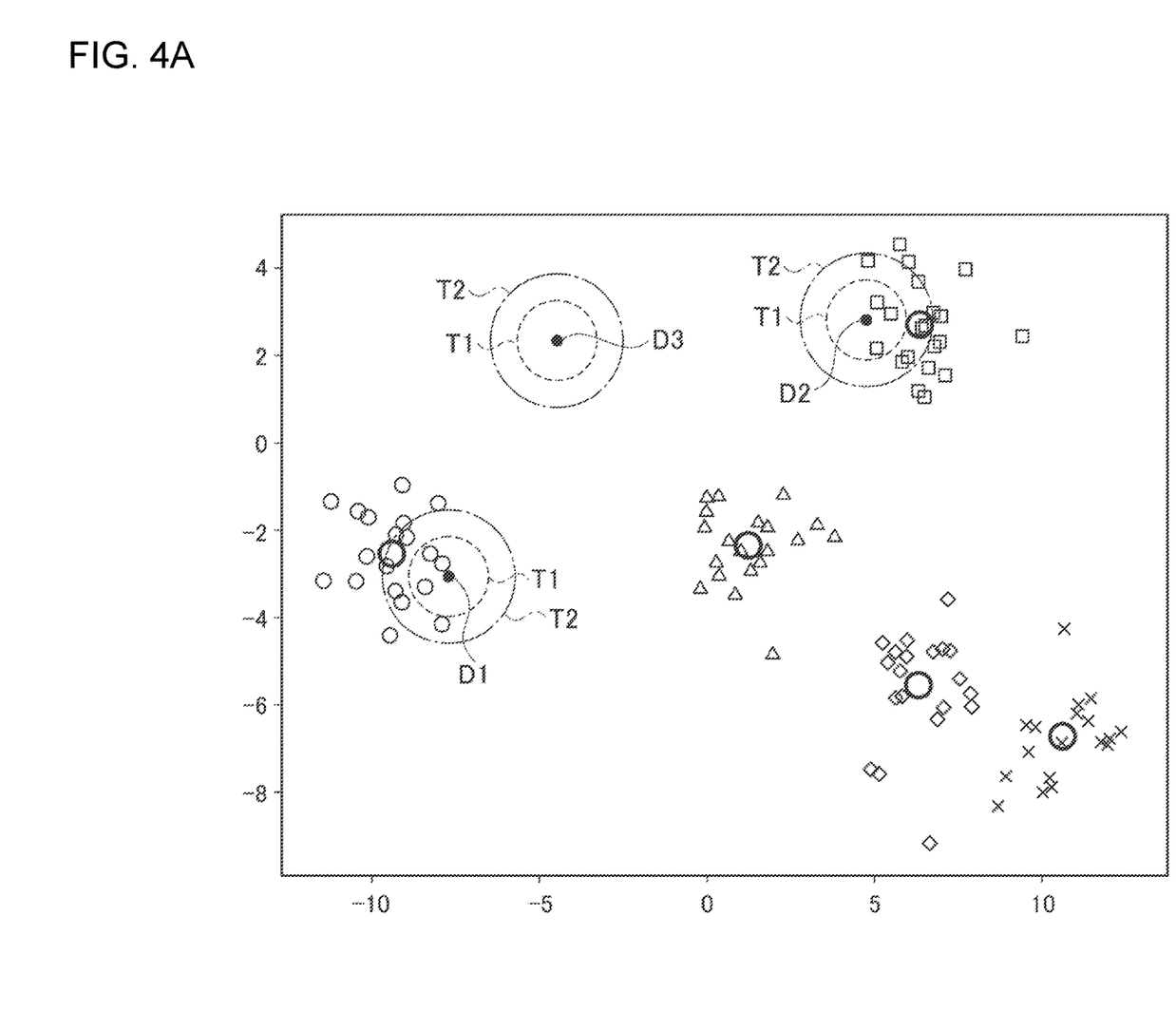
FIG. 4A is a first schematic diagram showing a relationship between classified state data and new state data.
Figure 4B:
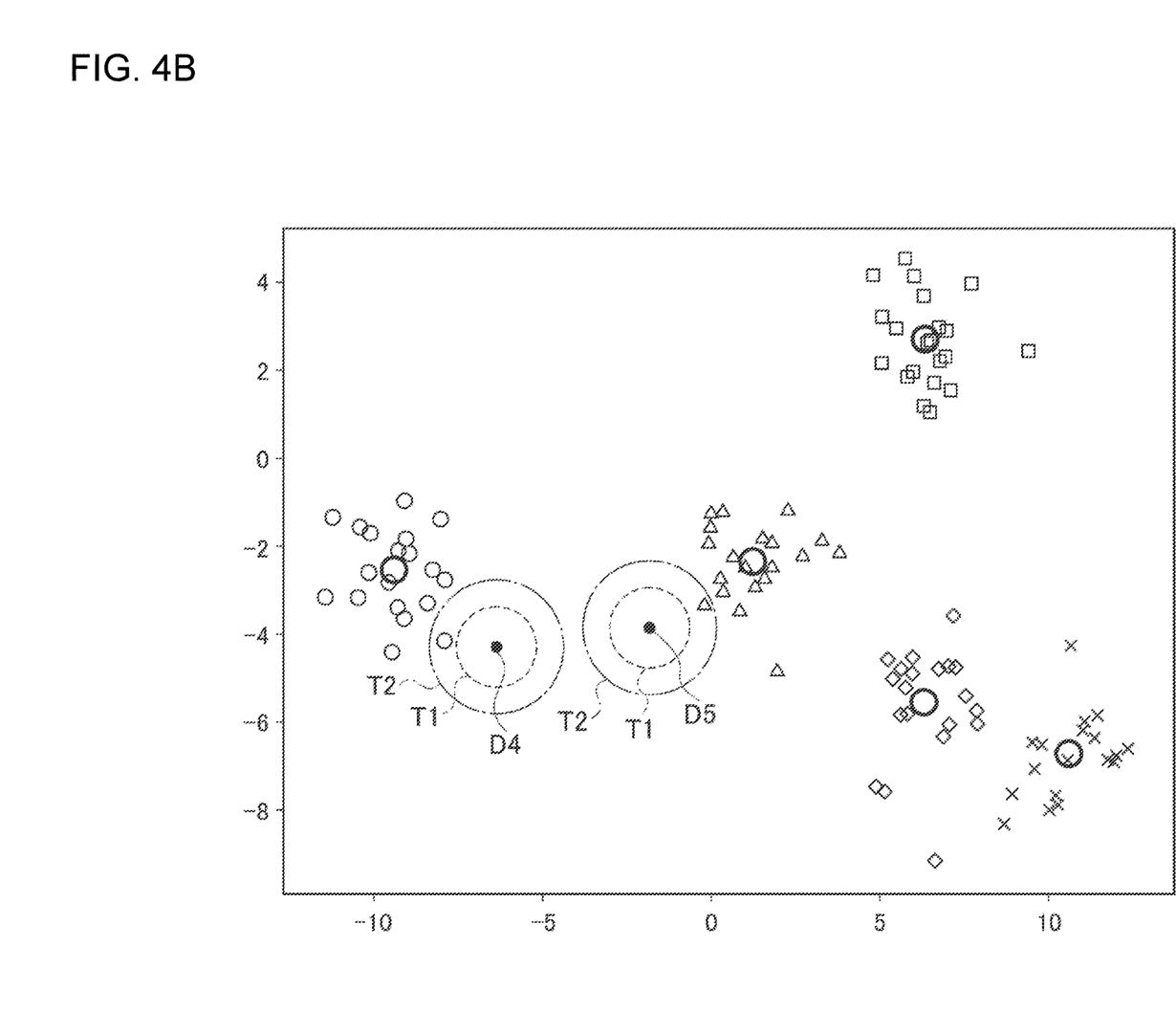
FIG. 4B is a second schematic diagram showing a relationship between classified state data and new state data.

Next, processing by the anomaly determination unit 126 for the newly read state data will be described with reference to FIGS. 4A and 4B. FIG. 4A is a first schematic diagram showing a relationship between classified state data and new state data. Further, FIG. 4B is a second schematic diagram showing a relationship between classified state data and new state data. The meanings of the symbols: White Circle, White Square, White Triangle, White Rhombus, and Cross in FIGS. 4A and 4B, and the meanings of the vertical axis and the horizontal axis are the same as those in FIG. 3.

In FIG. 4A, the data points corresponding to the newly read state data are shown as new data points D1, D2, and D3. The new data points D1, D2, and D3 are distinguished from the data point corresponding to the state data given as "supervised data" (the data point indicated by the symbols: White Circle, White Square, White Triangle, White Rhombus, and Cross).

Focusing on the new data point D1, while there are three data points (data points indicated by White Circle) belonging to the normal class CN1 in the area T1 of the points where the distance from the new data point D1 is equal to or less than a first threshold value, there are no data points belonging to other classes (data points indicated by White Square, White Triangle, White Rhombus, and Cross).

In this way, in a case where the number of data points of a specific class in which the distance from the data points corresponding to the newly read state data is equal to or less than the first threshold value is equal to or greater than a predetermined number ("in a case where there is a class that exists within the first threshold value"), the anomaly determination unit 126 determines that the newly read state data belongs to a specific class by using the first determination model.

In the case shown in FIG. 4A, the anomaly determination unit 126 determines that the state of the production robot 80 corresponding to the new data point D1 is "normal" by using the first determination model.

In addition, the anomaly determination unit 126 may determine that the state of the production robot 80 corresponding to the new data point D1 is "normal" based on exist of the normal class representative value PN1 in the area T1.

Focusing on the new data point D2, while there are three data points (data points indicated by White Square) belonging to the anomalous class CA1 in the area T1 of the points where the distance from the new data point D2 is equal to or less than the first threshold value, there are no data points belonging to other classes (data points indicated by White Circle, White Triangle, White Rhombus, and Cross).

In the case shown in FIG. 4A, the anomaly determination unit 126 determines that the state of the production robot 80 corresponding to the new data point D2 is "anomalous" by using the first determination model. Further, the anomaly determination unit 126 determines that the state of the production robot 80 is in "anomaly 1" corresponding to the anomalous class CA1.

In addition, the anomaly determination unit 126 may determine that the state of the production robot 80 corresponding to the new data point D2 is in "anomaly 1" based on exist of the anomalous class representative value PA1 in the area T1.

Focusing on the new data point D3, there is no data point corresponding to the state data given as "supervised data" in the area T2 of the point where the distance from the new data point D2 is equal to or less than the second threshold value (The second threshold value is assumed to be a value larger than the first threshold value).

In this way, in a case where the number of data points of a specific class in which the distance from the data points corresponding to the newly read state data is equal to or less than the second threshold value is 0 ("in a case where there is no class that exists within the second threshold value"), the anomaly determination unit 126 determines that the specific class to which the newly read state data belongs does not exist, by using the first determination model.

In the case shown in FIG. 4A, the anomaly determination unit 126 determines that the state of the production robot 80 corresponding to the new data point D3 is in an "unknown anomaly" by using the first determination model.

In addition, the anomaly determination unit 126 may determine that the state of the production robot 80 corresponding to a new data point D3 is in an "unknown anomaly" based on that the class representative values of a specific class (the normal class representative value PN1, the anomalous class representative values PA1, PA2, PA3, PA4) do not exist in the area T2.

In FIG. 4B, the data points corresponding to the newly read state data are shown as new data points D4 and D5. The new data points D4 and D5 are distinguished from the data point corresponding to the state data given as "supervised data" (the data point indicated by the symbols: White Circle, White Square, White Triangle, White Rhombus, and Cross).

Focusing on the new data point D4, while there is no data point corresponding to the state data given as "supervised data" in the area T1 of the point where the distance from the new data point D4 is equal to or less than the first threshold value, there is one data point (data point indicated by White Circle) belonging to the normal class CN1 in the area T2 of points where the distance from the new data point D4 is equal to or less than the second threshold value.

In this way, in a case where the number of data points of a specific class in which the distance from the data points corresponding to the newly read state data is equal to or less than the first threshold value is 0 and the number of data points of a specific class in which the distance from the data points corresponding to the newly read state data is equal to or less than the second threshold value is equal to or greater than a predetermined number ("in a case where there is no class existing in the first threshold value and there is a class that exists within the second threshold value"), the anomaly determination unit 126 further uses the second determination model to determine whether the state of the production robot 80 is classified into "normal" or "anomalous".

That is, unlike the determination of the new data point D1 shown in FIG. 4A, the anomaly determination unit 126 uses not only the first determination model but also the second determination model to perform determination of the new data point D4 shown in FIG. 4B. The anomaly determination unit 126 determines whether the state of the production robot 80 is "normal" or "anomalous".

Focusing on the new data point D5, while there is no data point corresponding to the state data given as "supervised data" in the area T1 of the point where the distance from the new data point D5 is equal to or less than the first threshold value, there is one data point (data point indicated by White Triangle) belonging to the anomalous class CA2 in the area T2 of points where the distance from the new data point D5 is equal to or less than the second threshold value.

Unlike the determination of the new data point D2 shown in FIG. 4A, the anomaly determination unit 126 uses not only the first determination model but also the second determination model to perform determination of the new data point D5 shown in FIG. 4B. The anomaly determination unit 126 determines whether the state of the production robot 80 is "normal" or "anomalous".

In this way, in a case where a definitive determination can be made based on the determination result by the first determination model (i.e., in a case illustrated by the new data points D1, D2, and D3 in FIG. 4A), the anomaly determination unit 126 performs the determination of the state of the production robot 80 by using only the first determination model. On the other hand, in a case where a definitive determination cannot be made (i.e., in a case illustrated by the new data points D4 and D5 in FIG. 4B), the anomaly determination unit 126 performs the determination of the state of the production robot 80 by using both the first determination model and the second determination model.

The anomaly determination unit 126 is not limited to the above example, and in a case where a definitive determination can be made based on the determination result by the second determination model, the anomaly determination unit 126 may use only the second determination model to perform determination of the state of the production robot 80. On the other hand, in a case where a definitive determination cannot be made, the anomaly determination unit 126 may use both the first determination model and the second determination model to perform determination of the state of the production robot 80.

In the above, the determination based on the K-nearest neighbors algorithm is performed as the first determination model, but various other methods by supervised learning may be used.

In a case where the state of the production robot 80 is determined using both the first determination model and the second determination model, there is possibility that the determination result of the first determination model and the determination result of the second determination model may be inconsistent. In such a case, the user may appropriately specify which determination result is preferentially used by the anomaly determination unit 126.

For example, in a case where the user wants to detect as many anomalies as possible in the production robot 80, the anomaly determination unit 126 may determine the state of the production robot 80 as "anomalous" if at least one of the first determination model and the second determination model determines that the state of the production robot 80 is "anomalous". On the contrary, the user does not want to detect as many anomalies as possible in the production robot 80, the anomaly determination unit 126 may determine the state of the production robot 80 as "normal" if at least one of the first determination model and the second determination model determines that the state of the production robot 80 is "normal".

Procedure of Anomaly Determination Process

Figure 2:
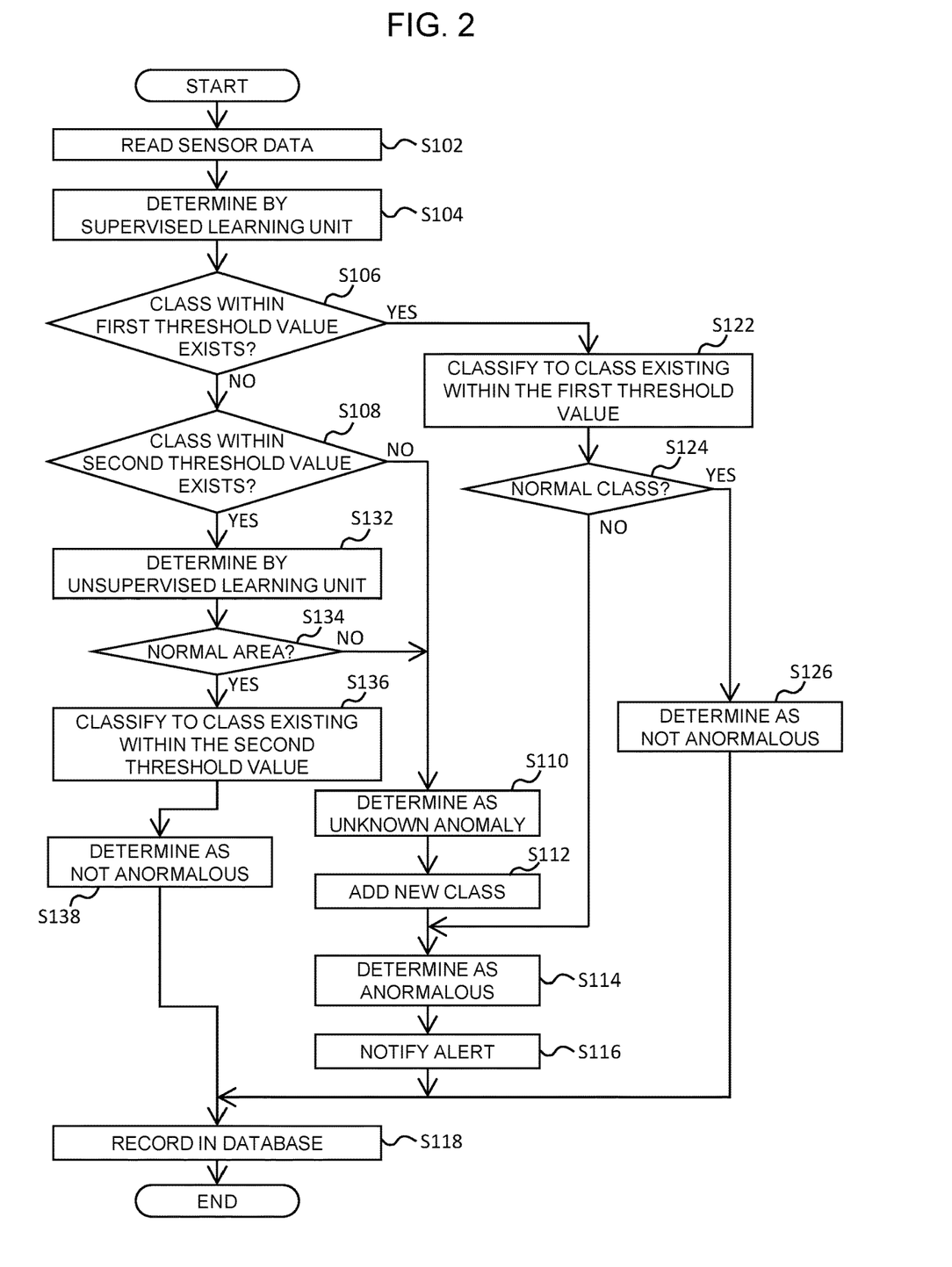
FIG. 2 is a flowchart showing a processing procedure of the anomaly determination device according to the embodiment of the present invention.

Next, an example of procedure of anomaly determination process according to the present embodiment will be described. FIG. 2 is a flowchart showing a processing procedure of the anomaly determination device according to the present embodiment. The procedure of the anomaly determination process shown in FIG. 2 is started when the observer or maintenance personnel gives an instruction to start the anomaly diagnosis or at a predetermined timing during the period when the production robot 80 is activated, and the procedure of the anomaly determination process is repeatedly executed every time the state data of the production robot 80 is input to the anomaly determination device 100.

In step S102, the control unit 120 reads the sensor data from the database 110. Specifically, the control unit 120 reads the state data of the production robot 80 from the database 110, and inputs the read state data into the supervised learning unit 122 and the unsupervised learning unit 124.

In step S104, the supervised learning unit 122 makes the determination based on the read state data. Specifically, the feature value calculation unit 122a calculates the feature value based on the read state data, and the classification unit 122b calculates the class corresponding to the calculated feature value.

In step S106, if there is no class existing within the first threshold value (if NO in step S106), the process proceeds to step S108.

In step S108, if there is no class existing within the second threshold value (if NO in step S108), the process proceeds to step S110, and it is determined that the state of the production robot 80 is in "unknown anomaly".

In step S112, the label setting unit 128 adds a "new class" corresponding to the "unknown anomaly".

In step S114, the anomaly determination unit 126 determines that the state of the production robot 80 is "anomalous". Then, in step S116, the anomaly determination unit 126 outputs the determination result to the notification unit 90, and the notification unit 90 notifies the user that the state of the production robot 80 is anomalous.

In step S118, the anomaly determination unit 126 outputs the determination result to the database 110.

In addition, if there is a class existing within the first threshold value in step S106 (if YES in step S106), the process proceeds to step S122, and the anomaly determination unit 126 classifies the read state data as belonging to the class existing within the first threshold value.

In step S124, the anomaly determination unit 126 determines whether or not the class in which the read state data is classified is the "normal class", and if it is determined that the class is the "normal class" (if YES in step S124), the process proceeds to step S126, and the anomaly determination unit 126 determines that the state of the production robot 80 is "normal". Then, the process proceeds to step S118.

In step S124, if it is determined that the class is the "anomalous class" (if NO in step S124), the process proceeds to step S114.

In addition, if there is a class existing within the second threshold value in step S108 (if YES in step S108), the process proceeds to step S132.

In step S132, the unsupervised learning unit 124 makes the determination based on the read state data. Specifically, the feature value calculation unit 124a calculates the feature value based on the read state data. The anomaly detecting unit 124b determines whether the read state data is classified in the "normal area" group or the "anomalous area" group and performs anomaly determination.

If the read state data is classified into the "normal area" group in step S134 (if YES in step S134), the process proceeds to step S136, and the anomaly determination unit 126 classifies the read state data as belonging to the class existing within the second threshold value. Then, in step S138, the anomaly determination unit 126 determines that the state of the production robot 80 is "normal". Then, the process proceeds to step S118.

If the read state data is classified into the "anomalous area" group in step S134 (if NO in step S134), the process proceeds to step S110.

Procedure of Anomaly Determination Process According to Modified Example

Figure 5:
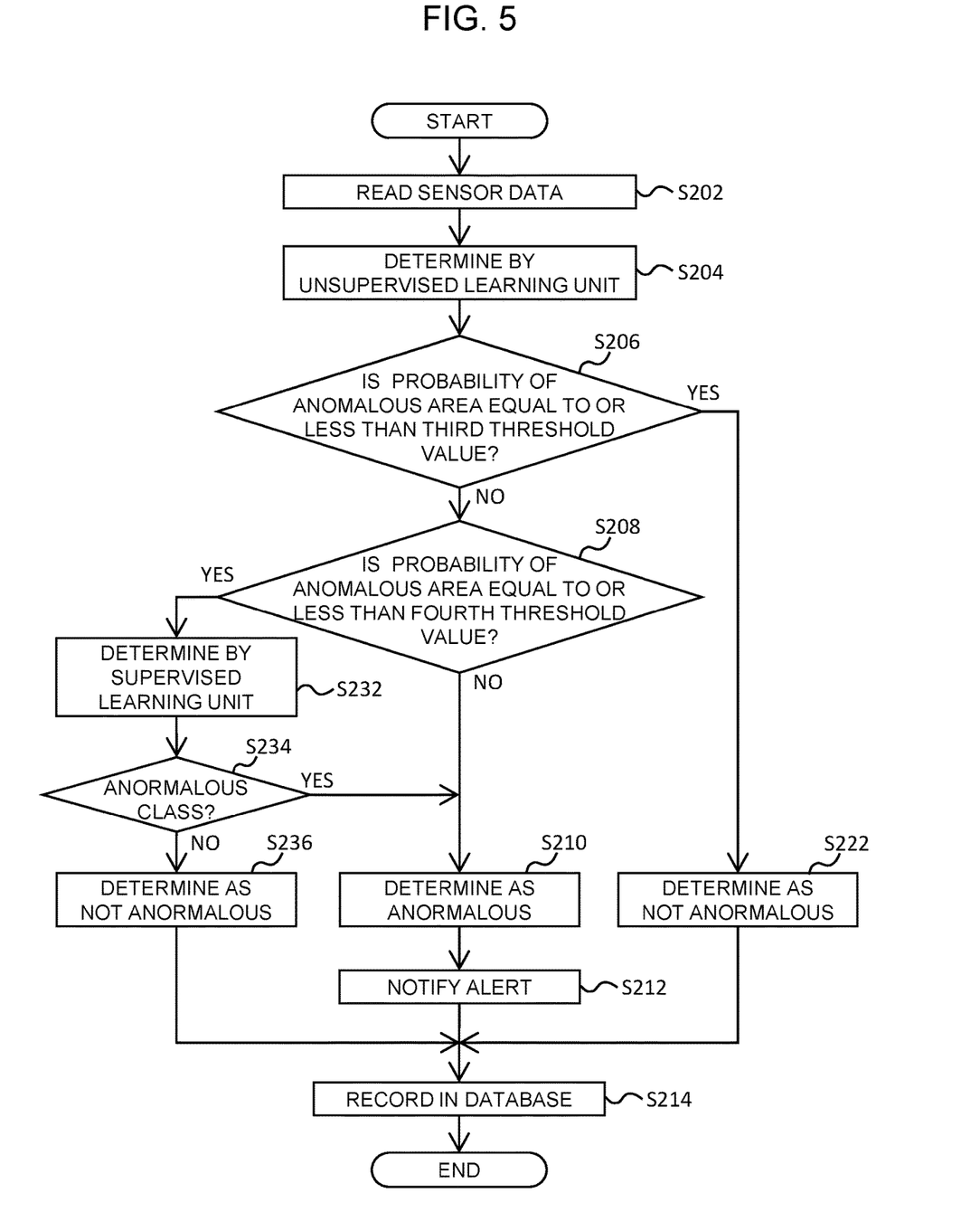
FIG. 5 is a flowchart showing a processing procedure of the anomaly determination device according to the modified example of the present invention.

Next, an example of procedure of anomaly determination process according to a modified example of the present embodiment will be described. FIG. 5 is a flowchart showing a processing procedure of the anomaly determination device according to the modified example. The procedure of the anomaly determination process shown in FIG. 5 is started when the observer or maintenance personnel gives an instruction to start the anomaly diagnosis or at a predetermined timing during the period when the production robot 80 is activated, and the procedure of the anomaly determination process is repeatedly executed every time the state data of the production robot 80 is input to the anomaly determination device 100.

In step S202, the control unit 120 reads the sensor data from the database 110. Specifically, the control unit 120 reads the state data of the production robot 80 from the database 110, and inputs the read state data into the supervised learning unit 122 and the unsupervised learning unit 124.

In step S204, the unsupervised learning unit 124 makes the determination based on the read state data. Specifically, the feature value calculation unit 124a calculates the feature value based on the read state data. The anomaly detecting unit 124b determines whether the read state data is classified in the "normal area" group or the "anomalous area" group and performs anomaly determination.

If the probability that the read state data is in the anomalous area is not equal to or less than a third threshold value based on the anomaly determination performed by the anomaly detecting unit 124b in step S206 (if NO in step S206), the process proceeds to step S208.

If the probability that the read state data is in the anomalous area is not equal to or less than a fourth threshold value based on the anomaly determination performed by the anomaly detecting unit 124b in step S208 (if NO in step S208), the process proceeds to step S210.

In step S210, the anomaly determination unit 126 determines that the state of the production robot 80 is "anomalous". Further, here, the anomaly determination unit 126 may use the determination result based on the first determination model in the supervised learning unit 122 to determine whether the "anomalous" state of the production robot 80 is an "unknown anomaly".

In step S212, the anomaly determination unit 126 outputs the determination result to the notification unit 90, and the notification unit 90 notifies the user that the state of the production robot 80 is anomalous.

In step S214, the anomaly determination unit 126 outputs the determination result to the database 110.

In addition, if the probability that the read state data is in the anomalous area is equal to or less than the third threshold value based on the anomaly determination performed by the anomaly detecting unit 124b in step S206 (if YES in step S206), the process proceeds to step S222, and the anomaly determination unit 126 determines that the state of the production robot 80 is "normal". Then, the process proceeds to step S214.

Further, in step S208, if the probability that the read state data is in the anomalous area is equal to or less than the fourth threshold value based on the anomaly determination performed by the anomaly detecting unit 124b (if YES in step S208), the process proceeds to step S232.

In step S232, the supervised learning unit 122 makes the determination based on the read state data. Specifically, the feature value calculation unit 122a calculates the feature value based on the read state data, and the classification unit 122b calculates the class corresponding to the calculated feature value.

In step S234, if the class in which the read state data is classified is an "anomalous class" based on the determination result of the supervised learning unit 122 (if YES in step S234), the process proceeds to step S210.

On the other hand, if the class in which the read state data is classified in step S234 is not the "anomalous class" (if NO in step S234), the process proceeds to step S236, and the anomaly determination unit 126 determines that the state of the production robot 80 is "normal". Then, the process proceeds to step S214.

Effect of Embodiments

As explained in detail above, the anomaly determination device and the anomaly determination method according to the present embodiment determines a device anomaly of a device by using a first determination result by a first determination model configured to determine, based on a state data of the device output from a sensor that detects a state of the device, whether a predetermined anomaly has occurred in the device, and a second determination result by a second determination model configured to classify the state of the device based on the state data, and output the device anomaly as an unknown anomaly in a case where the device anomaly is not the predetermined anomaly.

Therefore, the state of the device can be determined more accurately as compared with the case where the anomaly of the device is determined using the determination result of only one of the first determination model and the second determination model. Furthermore, the possibility of overlooking an unknown anomaly of the device can be reduced.

Further, the anomaly determination device and the anomaly determination method according to the present embodiment may classify the device anomaly into a predetermined anomalous class corresponding to the predetermined anomaly based on the first determination model and a feature value calculated from the state data. As a result, when an anomaly occurs in the device, the type of the anomaly can be grasped. Furthermore, it can be determined whether the anomaly occurred in the device is an unknown anomaly.

Furthermore, in a case where the anomalous class which difference from the feature value is equal to or less than a first threshold value exists, the anomaly determination device and the anomaly determination method according to the present embodiment may determine that the device anomaly is the predetermined anomaly corresponding to the anomalous class which difference from the feature value is equal to or less than the first threshold value. As a result, in a case where the definitive determination can be made from the determination result of the first determination model, it is possible to determine the anomaly of the device without requiring the determination result of the second determination model, and it is possible to reduce the amount of calculation.

Further, in a case where the anomalous class which difference from the feature value is equal to or less than a first threshold value does not exist and the anomalous class which difference from the feature value is equal to or less than a second threshold value exists, the anomaly determination device and the anomaly determination method according to the present embodiment may determine whether the unknown anomaly exists by using the first determination result of the first determination model and the second determination result of the second determination model. As a result, in a case where the definitive determination cannot be made from the determination result of the first determination model, the anomaly of the device can be further determined by using the determination result of the second determination model, and it is possible to determine the state of the device more accurately. Furthermore, the possibility of overlooking an unknown anomaly of the device can be reduced.

Furthermore, in a case where the anomalous class which difference from the feature value is equal to or less than a second threshold value does not exist, the anomaly determination device and the anomaly determination method according to the present embodiment may determine that the device anomaly is the unknown anomaly. As a result, when the definitive determination can be made from the determination result of the first determination model, it is possible to determine the anomaly of the device without requiring the determination result of the second determination model, and it is possible to reduce the amount of calculation. Furthermore, the possibility of overlooking an unknown anomaly of the device can be reduced.

Further, in the anomaly determination device and the anomaly determination method according to the present embodiment, the first determination model may be generated by supervised learning. Further, the model generated by supervised learning may be generated by performing machine learning using past state data of the device as supervised data. As a result, the past state data of the device can be used for the anomaly determination based on the newly read state data, and the state of the device can be determined more accurately.

Furthermore, in a case where the device anomaly is not the predetermined anomaly, the anomaly determination device and the anomaly determination method according to the present embodiment may add the unknown anomaly as the predetermined anomaly and may modify the first determination model based on the state data of the device in which the unknown anomaly has occurred. Thereby, the anomaly of the device similar to the unknown anomaly detected in the anomaly determination at a certain time can be determined in the future anomaly determination. As a result, the state of the device can be determined more accurately.

Further, the anomaly determination device and the anomaly determination method according to the present embodiment may classify the state of the device into at least one of a normal state and an anomalous state of the device by using the second determination model. Further, the second determination model may be generated by unsupervised learning. As a result, a model different from the first determination model is used, and the state of the device can be determined more accurately.

Respective functions described in the above embodiment may be implemented by one or plural processing circuits. The processing circuits include programmed processing devices such as a processing device including an electric circuit. The processing circuits also include devices such as an application specific integrated circuit (ASIC) and conventional circuit elements that are arranged to execute the functions described in the embodiment.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. Based on the present disclosure, various alternative embodiments, practical examples, and operating techniques will be apparent to those skilled in the art.

In is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 100 anomaly determination device
102 communication unit (input unit)
110 database
120 control unit
122 supervised learning unit
122a feature value calculation unit
122b classification unit
124 unsupervised learning unit
124a feature value calculation unit
124b anomaly detecting unit
126 anomaly determination unit
128 label setting unit
80 production robot
82 communication unit
84 measurement unit
86 sensor
90 notification unit

The invention claimed is:

1. An anomaly determination device for determining a device anomaly of a device, comprising:
   a receiver configured to receive data output from a sensor that detects a state of the device;
   a controller;
   memory in electronic communication with the controller; and
   instructions stored in the memory, the instructions being executable to implement a method comprising:
      acquire a state data of the device output from the sensor via the receiver,
      determine the device anomaly by performing a second determination by a second determination model configured to classify the state of the device based on the state data, after performing a first determination by a first determination model configured to determine, based on the state data, whether a predetermined anomaly has occurred in the device, wherein the first determination model is generated by supervised learning and the second determination model is generated by unsupervised learning, and
      output the device anomaly as an unknown anomaly in a case where the device anomaly is not the predetermined anomaly,
   wherein the first determination model is generated in advance by performing machine learning based on supervised data consisting of a "feature value" calculated based on a past state data of the device and a "class" indicating the state of the device that outputs the state data,
   wherein the second determination model is generated in advance by performing machine learning based on the "feature value" based on the past state data of the device, and
   wherein the controller is configured to determine whether the unknown anomaly exists by using a first determi-
nation result of the first determination model and a second determination result of the second determination model.

2. The anomaly determination device according to claim 1, wherein
   the method further comprises classifying the device anomaly into a predetermined anomalous class corresponding to the predetermined anomaly based on the first determination model and a feature value calculated from the state data.

3. The anomaly determination device according to claim 2, wherein
   the method further comprises, in a case where the anomalous class which difference from the feature value is equal to or less than a first threshold value exists, determining that the device anomaly is the predetermined anomaly corresponding to the anomalous class which difference from the feature value is equal to or less than the first threshold value.

4. The anomaly determination device according to claim 2, wherein
   the method further comprises, in a case where the anomalous class which difference from the feature value is equal to or less than a first threshold value does not exist and the anomalous class which difference from the feature value is equal to or less than a second threshold value exists, determining whether the unknown anomaly exists by using the first determination result of the first determination model and the second determination result of the second determination model.

5. The anomaly determination device according to claim 2, wherein
   the method further comprises, in a case where the anomalous class which difference from the feature value is equal to or less than a second threshold value does not exist, determining that the device anomaly is the unknown anomaly.

6. The anomaly determination device according to claim 1, wherein
   the first determination model generated by supervised learning is generated by performing machine learning using past state data of the device as supervised data.

7. The anomaly determination device according to claim 1, wherein
   the method further comprises, in a case where the device anomaly is not the predetermined anomaly, adding the unknown anomaly as the predetermined anomaly and to modify the first determination model based on the state data of the device in which the unknown anomaly has occurred.

8. The anomaly determination device according to claim 1, wherein
   the method further comprises classifying the state of the device into at least one of a normal state and an anomalous state of the device by using the second determination model.

9. An anomaly determination method comprising:
   acquiring, via a receiver, a state data of a device output from a sensor that detects a state of the device,
   determining, via a controller, a device anomaly of the device by performing a second determination by a second determination model configured to classify the state of the device based on the state data, after performing a first determination by a first determination model configured to determine, based on the state data, whether a predetermined anomaly has occurred in the device, wherein the first determination model is generated by supervised learning and the second determination model is generated by unsupervised learning, and outputting the device anomaly as an unknown anomaly in a case where the device anomaly is not the predetermined anomaly, wherein the first determination model is generated in advance by performing machine learning based on supervised data consisting of a "feature value" calculated based on a past state data of the device and a "class" indicating the state of the device that outputs the state data, wherein the second determination model is generated in advance by performing machine learning based on the "feature value" based on the past state data of the device, and wherein the controller is configured to determine whether the unknown anomaly exists by using a first determination result of the first determination model and a second determination result of the second determination model.

\* \* \* \* \*